INVENTOR
PETER RIDGWAY WATT
BY
Irwin S. Thompson
ATTORNEY

Sept. 20, 1966  P. R. WATT  3,274,076
FRACTIONATING STILLS
Filed Feb. 19, 1963  5 Sheets-Sheet 4
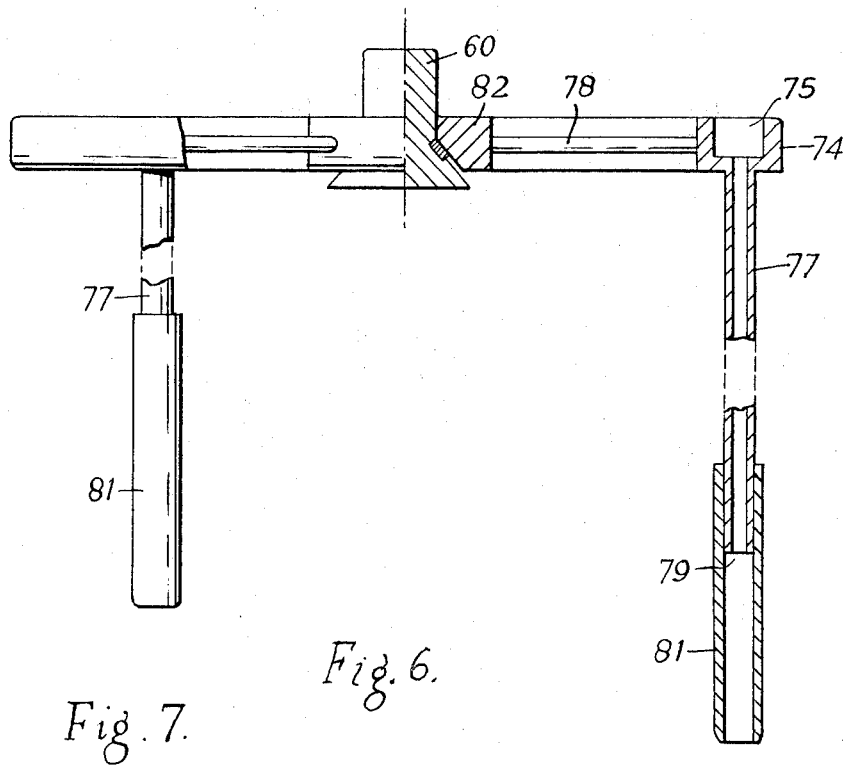
Fig. 6.
Fig. 7.
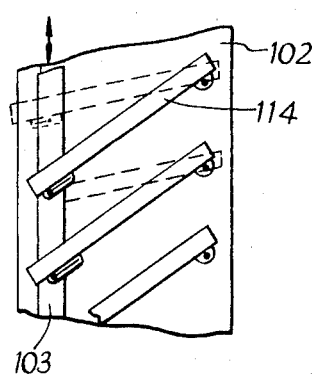
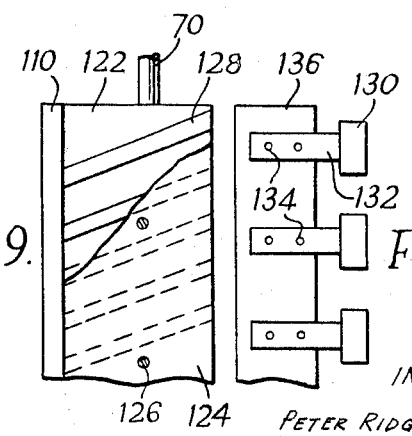
Fig. 9.  Fig. 10.
INVENTOR
PETER RIDGWAY WATT
BY
Irwin A. Thompson
ATTORNEY

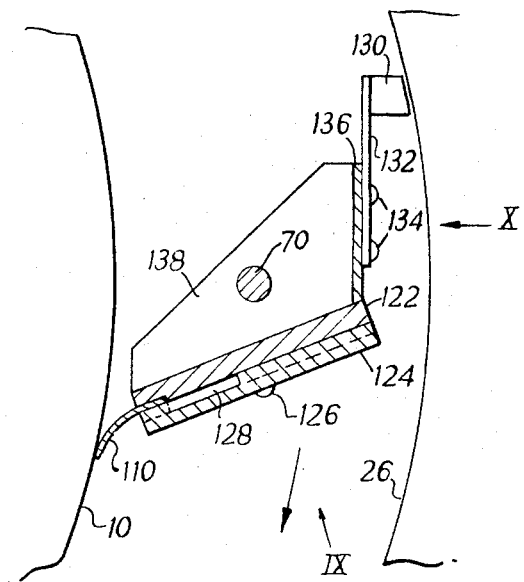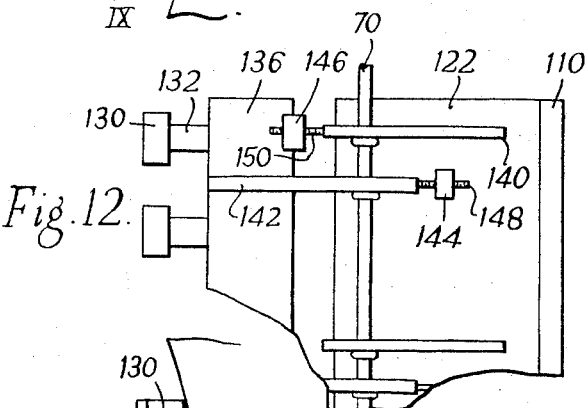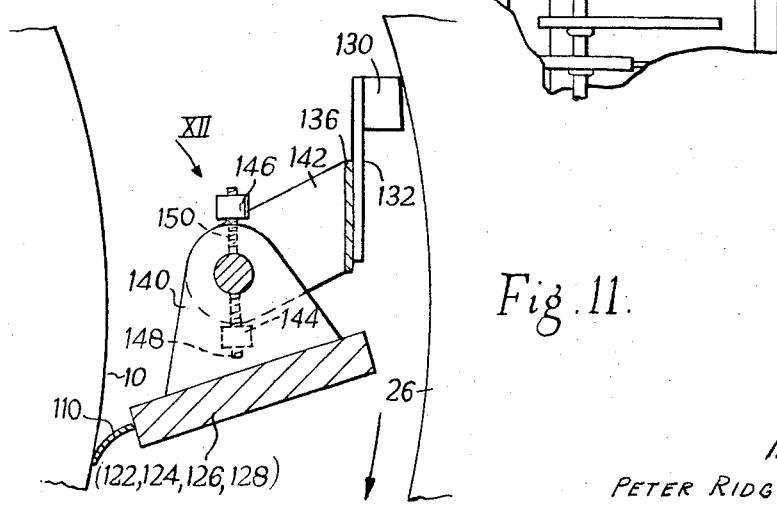

United States Patent Office 3,274,076
Patented Sept. 20, 1966

3,274,076
FRACTIONATING STILLS
Peter Ridgway Watt, Reigate, Surrey, England, assignor to Vitamins Limited, London, England, a British company
Filed Feb. 19, 1963, Ser. No. 259,544
Claims priority, application Great Britain, Mar. 1, 1962, 8,059/62
13 Claims. (Cl. 202—187)

The present invention relates to high-vacuum distillation apparatus.

It is an object of the present invention to provide a falling-film wiped molecular fractionating still of high efficiency, having the evaporator and condenser in close spatial relationship with each other.

A molecular fractionating still according to the invention includes a stationary, coolable condenser surface surrounded by a stationary, heatable evaporator surface, such surfaces being surfaces of revolution about the same vertical axis, at least one transfer element mounted for rotation about such axis between such surfaces and in contact with the condenser surface and having a plurality of inclined channels for transferring liquid from a given point on the condenser surface to a higher point on the evaporator surface, and at least one wiper mounted for rotation about such axis in wiping contact with the evaporator surface.

The condenser and evaporator surfaces are most conveniently respectively the inner and outer surfaces of a cylindrical condenser and a cylindrical evaporator, although they may also for example be the surfaces of cones.

The distance separating the surfaces must be sufficiently large to contain the transfer elements and wipers therein, but is otherwise preferably small so as to allow vapour from any given point on the evaporating surface to be condensed on a small portion of the opposed condensing surface.

There are also included in the still means for supplying distillate and for removing the final distilland residue, and means for heating the evaporating surface and for cooling the condensing surface, and an evacuable chamber surrounds all the other parts of the still.

The transfer elements and wipers preferably extend over the entire vertical length of the evaporator and condenser surfaces, and are conveniently mounted together on the same rotatable framework. Each transfer element preferably bears a large number of inclined channels, which may be open at the top but are preferably closed, i.e., tubular; the fractionating power of the still may be altered by adjusting the angle of the channels, either by constructing the channels to pivot at one end or by changing the part of the transfer elements which bear the channels.

The invention will be described in conjunction with the accompanying drawings, in which:

FIG. 6 is a view corresponding to part of FIG. 1 showing an alternative means of delivering feed;

FIG. 7 is a view corresponding to part of FIG. 4 showing an alternative construction of the ducts;

FIG. 8 is a transverse section of another embodiment of rotating assembly;

FIGS. 9 and 10 are side views of the assembly of FIG. 8, from the directions shown by the arrows IX and X;

FIG. 11 is a transverse section of a further embodiment of rotating assembly; and FIG. 12 is a side view of the assembly of FIG. 11, from the direction shown by the arrow XII.

The principal components of the still are a cylindrical condenser, surrounded by a cylindrical evaporator, with wiping and transfer elements which rotate in the space therebetween, all being contained in a vacuum chamber.

Figure 1:
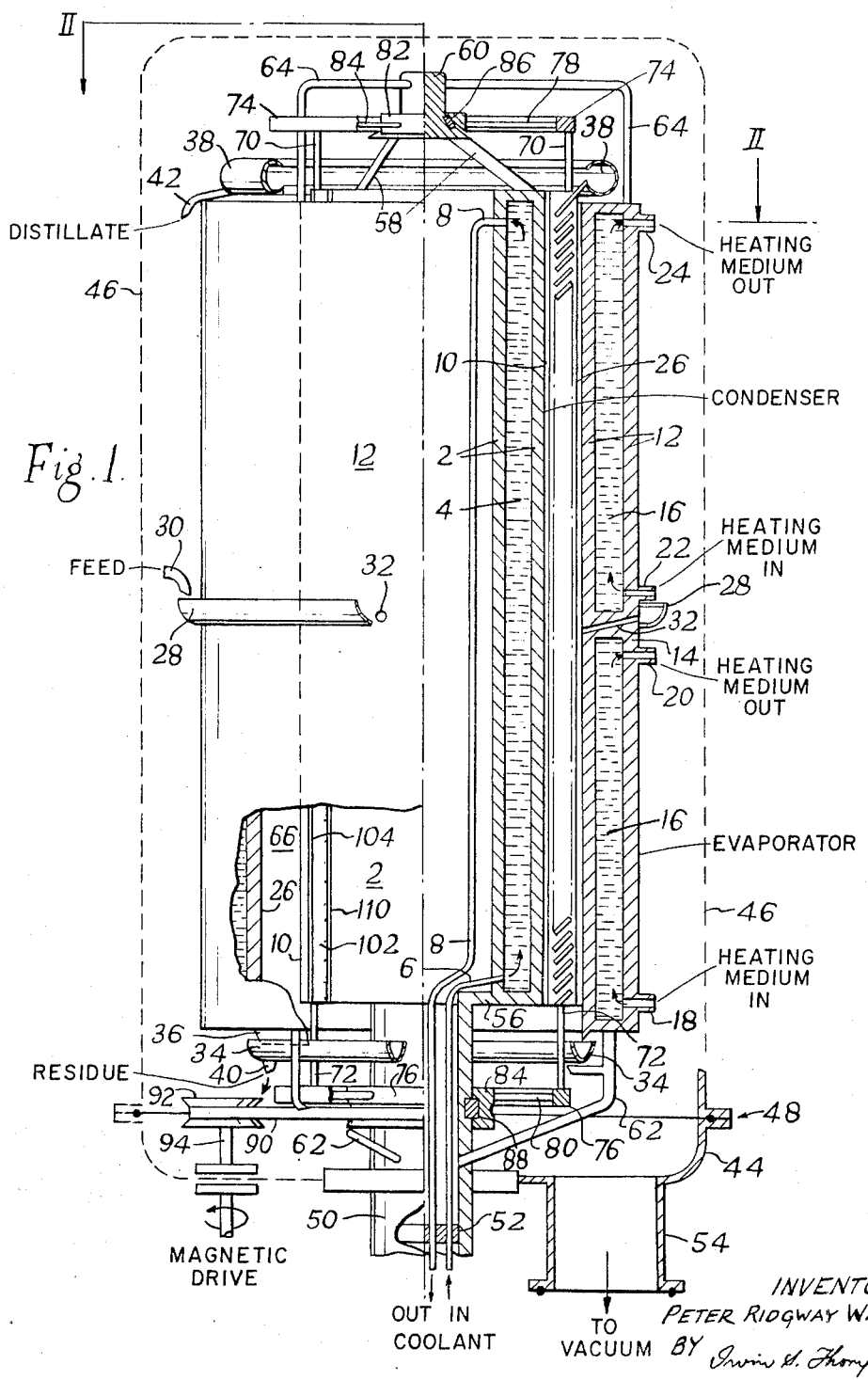
FIG. 1 is an elevational view, sectioned on the right-hand side, of one preferred embodiment of a still according to the invention.
Figure 2:
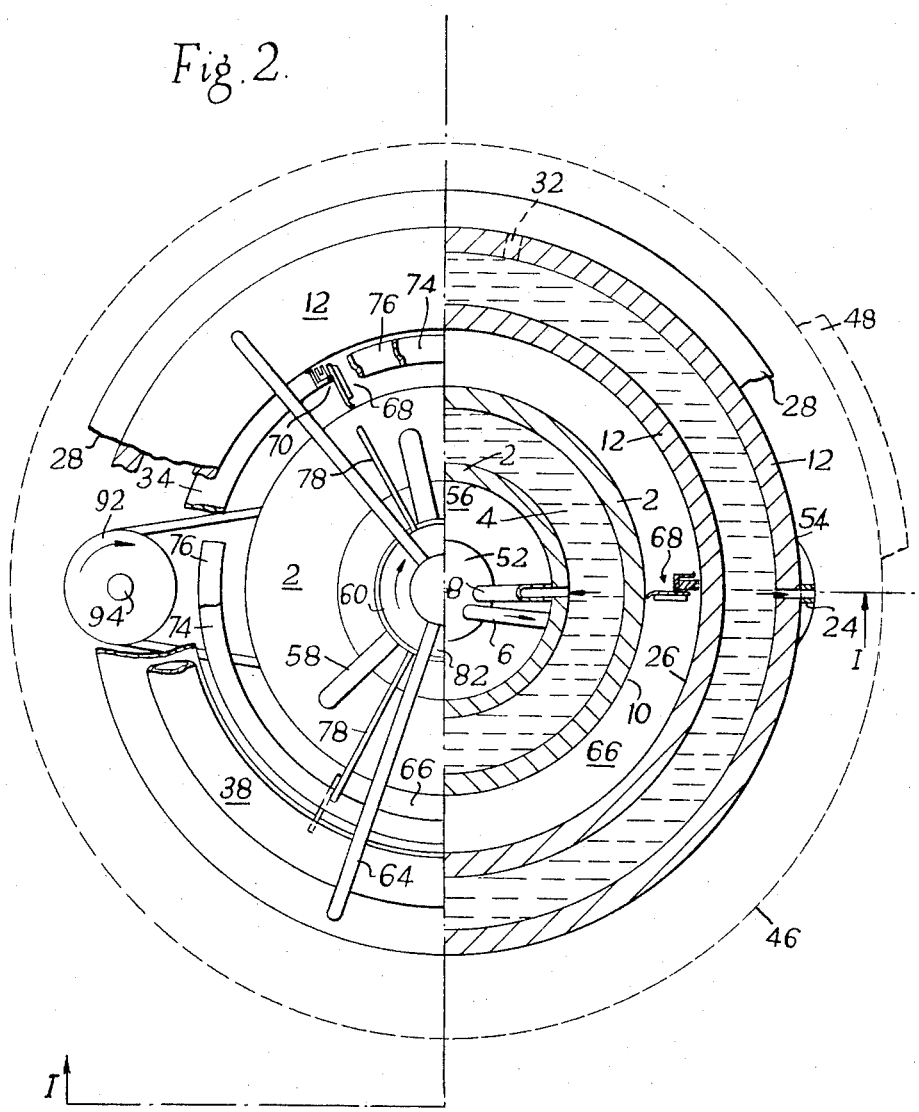
FIG. 2 is a view from above, the right-hand half being sectioned along the plane II—II of FIG. 1.

Referring to FIGURES 1 and 2, the condenser consists of a double-walled cylinder which forms a jacket through which cooling fluid 4 can circulate via pipes 6 and 8, and has a smooth cylindrical outer condensing surface 10. The evaporator likewise is a double-walled cylinder 12, but this is divided into two heating jackets of about equal length by a web 14; heating fluid 16 can circulate through the jackets via pipes 18, 20, 22 and 24. The smooth evaporator surface 26 is concentric with the condenser surface 10.

Surrounding the evaporator is a gutter 28 for containing feed distilland from a supply 30; holes 32 traversing the web 14 allow the feed liquid to be supplied to the evaporator surface 26. A gutter 34 collects final residue falling from a drain ridge 36 at the foot of the evaporator. Above the evaporator is another gutter 38, open on its inner side, which collects final distillate. The final residue and distillate are led off from the gutters 34 and 38 via pipes 40 and 42 respectively.

The vacuum chamber comprises a lower dished base portion 44 and an upper cylindrical portion 46 closed at the top (indicated only by broken lines); the two portions are joined at 48 by flanges sealed by an O-ring. A stout stem 50 passes through the base portion 44, and is sealed by a vacuum-tight plug 52 through which the cooling fluid pipes 6 and 8 pass. Other connections (pipes 18, 20, 22, 24, 30, 40, 42) pass through the stem or through the base portions 44, to which the vacuum manifold 54 is also attached.

The condenser 2 is supported at its base by a flange 56 attached to the stem 50. To the top of the condenser 2 a spigot 60 is attached by a spider 58 which is accurately coaxial with the condenser surface. The evaporator 12 is supported from the stem 50 and the spigot 60 by respective spiders 62 and 64, to which the gutters 38 and 34 are also attached.

In the space 66 between the evaporator and condenser is a rotatable wiping and transfer assembly. This comprises three equi-spaced units 68 supported at top and bottom by rods 70, 72 from rings 74, 76, which are in turn mounted from the spigot 60 and the stem 50 by spokes 78 and 80 connected to bearer rings 82 and 84 which are rotatable on dry bearings (made of, e.g., polytetrafluoroethylene (P.T.F.E.)) 86 and 88. A drive belt 90 passes around the lower bearer ring 84 and around a drive pulley 92 mounted on the spindle 94. The drive pulley 92 is driven from a motor which may be outside the vacuum chamber and magnetically coupled to the spindle 94 through the base portion 44, or the spindle 94 may pass through a rotary seal unit in the base portion 44.

Figure 3:
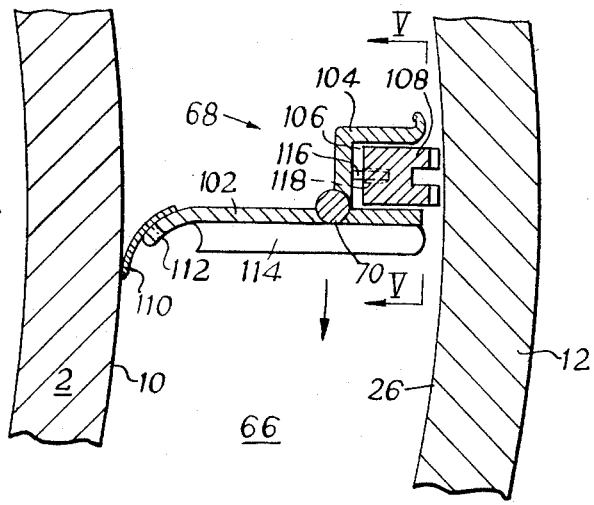
FIG. 3 is a view on an enlarged scale of the rotating assembly shown on the right-hand side of FIG. 2.
Figure 4:
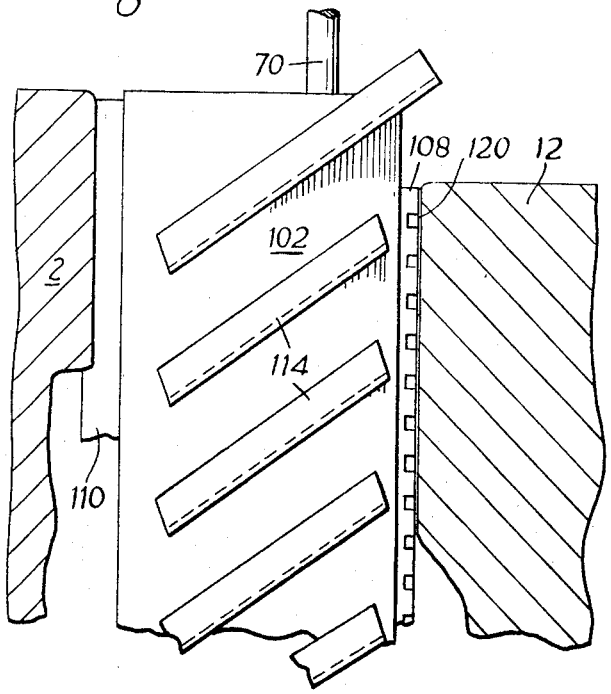
FIG. 4 is an elevational view of the structure of FIG. 3.
Figure 5:
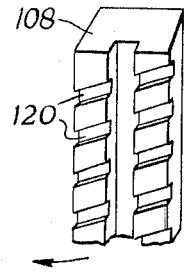
FIG. 5 is a perspective view of an evaporator wiper, on the line V—V in FIG. 3.

Referring to FIGURES 3, 4 and 5, each unit 68 of the rotating assembly is constructed as follows. A plate 102 bears towards its outer edge a flange 104 which forms with the plate 102 a channel in which is an evaporator wiper 108. The inner edge of the plate 102 is slightly curved forward with respect to its direction of rotation and has a flexible scraper blade 110 attached thereto by rivets 112 so that the blade is pressed against the condenser. The forward face of the plate 102 bears inclined ducts 114 placed close together and overlapping each other so that liquid taken up on the plate 102 cannot fail to be caught in a duct as it moves horizontally outward. The other end of the uppermost duct is on a level with the opening of the gutter 38. The scrapper blade 110 can be constructed of P.T.F.E.

The evaporator wiper 108 is held in the channel 106 by pins 116 engaging with sockets 118 in the wiper, so as to allow the wiper a limited amount of horizontal movement. The face of the wiper adjacent to the evaporator has numerous inclined channels 120 cut therein (FIG. 5).

The operation of the still is as follows:

The vacuum chamber comprising the base portion 44 and the cylindrical portion 46 is evacuated through the manifold 54 by a conventional vacuum pumping arrangement. The drive pulley 92 is set in motion so as to rotate the assembly 68, 70, 72, 74, 76, 78, 80, 82 and 84 upon the bearings 86 and 88. The scrapers 110 are then in resilient contact with the condensing surface 10 and the wipers 108 are flung centrifugally outward in their channels 106 so as to contact the evaporating surface 26. Cold and hot liquids 4 and 16 are circulated through the jackets 2 and 12 respectively (the lower of the jackets 12 is usually arranged to be at a higher temperature than the upper jacket), and when these have reached steady temperatures the distilland, preferably degasified, is fed into the gutter 28 whence it passes through the holes 32 and commences falling down the evaporator surface 26; the distilland is spread into a uniform film by the rotating wipers 108 and its downward movement is speeded by the inclined channels 120 therein.

The more volatile portion of the distillate film is evaporated from the surface 26 by the heat in the jackets 12, and is condensed on the opposed surface 10. The scraper blade 110 transfers the film of distilland to the plate 102 where it is caught on the ducts 114 and flung by centrifugal force up the ducts and then horizontally out upon the surface 26 again, but at a point higher up than formerly; this process is repeated with the volatile portion until it is eventually flung out of the topmost of the ducts 114 into the gutter 38.

The less volatile portion finally falls from the drain ridge 36 and is collected as residue in the gutter 34.

The foregoing embodiment is not limitative and various modifications thereof are possible.

The condenser can be pierced by holes connecting the space 66 with the central space within the condenser; alternatively, the condenser can be made in several sections. These modifications improve the vacuum pumping efficiency and become more desirable as the size of the still is increased.

The flange 56 supporting the condenser from the stem 50 can be replaced by a spider.

The feed distilland can be supplied in any of four ways; the first three of these are suitable for continuous distillation.

(1) On to the surface 26 from an annular gutter halfway up and surrounding the evaporator, as in the embodiment illustrated.

(2) On to the surface 26 from an annular gutter attached to or formed as part of the wiper ring 74. This arrangement is illustrated in FIG. 6, which shows a gutter 75 formed in the ring 74 and communicating with feed pipes 77, each of which opens at a point 79 about halfway down the still; over the end of each feed pipe a further short piece of pipe 81 is fitted as a sliding fit and by adjustment of the position of the pipe 81 the position of the supply of feed may readily be altered as desired when the still is being prepared for operation. These pipes 77 are preferably separate from the support rods 70, 72, but the same in number and are closely adjacent to them and in front of the rotating assembly so that the debouched feed is caught immediately on the transfer elements. In this way, the distilland is distributed very efficiently around the circumference of the still.

(3) On to the surface 10 by pipes up the stem 50 terminating at holes in the condenser; in this arrangement, it may however be difficult to keep the pipes clean.

(4) For batch distillation, the distilland is placed in a pot boiler communicating with the still from below and the vapours rise into the still where they condense on the condenser.

The number of rotating elements need not be three, although this is the most convenient number.

The evaporator wipers can be vibrated to give extra efficiency of wiping action, by any known method. In this case, the sockets 118 in the wipers are extended vertically to form slots to permit the vibratory movement.

The uppermost of the ducts 114 need not project beyond the others so long as it terminates at the level of the final distillate gutter 38.

Small stills can be constructed with the condenser accurately cylindrical and concentric with the spigot 60, so that a scraper blade 110 is not required; instead, a gap of one thousandth of an inch is left between the condenser and the plate 102 so that any film thicker than one thousandth of an inch is removed. In small stills, to reduce the difficulties of constructing the elements 68 on a small scale, they can be machined entirely from an approximately square-section rod, ducts being milled in the forward face thereof and a slot being cut in the outer face to form the channel 106 containing the wiper 108; as already indicated, no scraper blade 110 is needed.

The heating jacket 12 can be replaced by electrical heating means.

A modified form of transfer element is shown in FIG. 7, whereby the fractionating power of the still can be varied as desired, by altering the angle of inclination of the ducts 114. This is accomplished by having one end of each duct pivoted to the plate 102 and the other end pivoted to a strip 103 which lies against and is movable with respect to the plate 102. By removing this strip, all the ducts are caused to swivel as shown by the dotted lines and the fractionating power of the still is thereby altered. A range of fractionating powers and a corresponding range of total feed rates is thereby attained within a single still of given size, i.e. having a fixed gross rate of evaporation. Alternatively, the fractionating power can be varied by having various strips bearing ducts at different fixed angles and substituting these strips one for another on the plates 102 as desired.

Further modifications which may be made to the wipers and transfer elements are illustrated in FIGS. 8 to 12. The open ducts 114 can be replaced by entirely closed channels, thus reducing loss of liquid during its passage down the ducts. The wipers and transfer elements may be mounted either together or independently of each other so that each is pressed by centrifugal force against the surface of the evaporator or condenser, respectively. An alternative form of wiper may be used.

Referring to FIGS. 8 to 10, a unit of the rotary assembly is shown in which wiping and transfer elements are rigidly connected, as in the embodiment of FIGS. 1–5, but the whole rotating element is pivotable about its support rod. The transfer element is constructed from two plates 122 and 124 attached together by screws 126; channels 128 are milled obliquely on the inner surface of one of the plates; one chanel is seen cut across obliquely in FIG. 8 and two channels are shown in FIG. 9, where the plate 124 is broken away. A scraper blade 110 is again necessary at the inner edge of the element, unless the parts can be machined with such precision that the element can rotate within one thousandth of an inch of the surface 10. The element can, as illustrated, be placed obliquely to the radius of the still and such arrangement permits a longer length of channel 128 to be used. Liquid collected on the blade 110 passes up the channels and is flung on to the surface 26, in a similar manner to the passage of liquid up the ducts 114 in the embodiment of FIGS. 1–4; however, the liquid is retained within the closed channels 124 better than in the open ducts 114. The fractionating power may readily be altered by unscrewing the screws 126 and replacing the plate 124 by another plate having channels cut at a different angle.

The wiper is composed of a number of blocks 130 which may be constructed of P.T.F.E., carbon, boron nitride or other low-friction materials, and each is resiliently mounted on a strip 132 of springy material such as steel, beryllium or copper, attached by screws 134 to a plate 136.

Both the transfer element and the wiper are, in this embodiment, mounted from opposite ends of a number of plates 138, as seen in FIG. 8, the plates being pivotal upon the support rod 70 and the centre of mass of the whole rotatable element being such as to cause the members 110 and 130 to bear respectively against the surfaces 10 and 26 during operation of the still.

In the embodiment shown in FIGS. 11 and 12, the wipers and transfer elements are mounted separately, the transfer elements upon a series of plates 140 and the wipers upon another series of plates 142. Counterweights 144 and 146 are mounted on at least some of the plates, preferably adjustably upon threaded spindles 148 and 150 as illustrated, so as to cause the members 110 and 130 to bear against the surfaces 10 and 26.

I claim:

1. A molecular fractionating still, comprising a stationary convex first heat transfer surface surrounded by a stationary concave second heat transfer surface, one of said surfaces being a surface of a coolable condenser and the other of said surfaces being a surface of a heatable evaporator, said surfaces being surfaces of revolution about the same vertical axis, at least one liquid transfer element mounted for rotation about said axis between said surfaces and in scraping contact with the condenser surface and having a plurality of inclined channels for transferring liquid from the condenser surface to higher points on the evaporator surface.

2. A still as claimed in claim 1, said transfer element being in wiping contact with said evaporator surface.

3. A still as claimed in claim 1, in which a flexible blade carried by said transfer element provides said scraping contact with said condenser surface.

4. A still as claimed in claim 1, said transfer element carrying a plurality of blocks movable relative to the transfer element and in wiping contact with said evaporator surface.

5. A still as claimed in claim 1, said convex first surface being said condenser surface and said concave second surface being said evaporator surface.

6. A still as claimed in claim 5, in which at least one feed hole is formed through the evaporator for supplying distilland to the evaporator surface.

7. A still as claimed in claim 5, and a gutter for distilland, the gutter being carried by the evaporator, and a feed pipe extending downwardly from the gutter through the evaporator and opening into the evaporator surface.

8. A still as claimed in claim 1, in which each said transfer element comprises a plate extending vertically the length of the evaporator and bearing said inclined channels.

9. A still as claimed in claim 8, in which the angle of the channels is adjustable, whereby the fractionating power of the still may be altered.

10. A still as claimed in claim 8, in which the channels are enclosed within the transfer element.

11. A still as claimed in claim 1, said transfer element being mounted on rods connected at top and bottom to a rotatable framework.

12. A still as claimed in claim 11, in which the transfer element is mounted pivotally upon the rods so as to press on said evaporator and condenser surfaces during rotation of said transfer element about said axis.

13. A still as claimed in claim 12, in which said transfer element includes wipers in wiping contact with said evaporator surface, said wipers being mounted for pivotal movement independently of the rest of the transfer element.

References Cited by the Examiner
UNITED STATES PATENTS 2,993,842  7/1961  Smith _____ 202—236 X
3,020,211  2/1962  Smith _____ 202—236 X NORMAN YUDKOFF, *Primary Examiner.*

J. SOFER, *Assistant Examiner.*